US007037633B2

(12) United States Patent
Hopper et al.

(10) Patent No.: US 7,037,633 B2
(45) **Date of Patent: *May 2, 2006**

(54) TONER PROCESSES

(75) Inventors: Michael A. Hopper, Toronto (CA); Raj D. Patel, Oakville (CA)

(73) Assignee: Xerox Corporation, Stamford, CT (US)

( * ) Notice: Subject to any disclaimer, the term of this patent is extended or adjusted under 35 U.S.C. 154(b) by 372 days.

This patent is subject to a terminal disclaimer.

(21) Appl. No.: 10/606,298

(22) Filed: Jun. 25, 2003

(65) Prior Publication Data

US 2005/0255402 A1 Nov. 17, 2005

(51) Int. Cl.
*G03G 9/08* (2006.01)
*C08J 3/215* (2006.01)

(52) U.S. Cl. .................................. 430/137.14; 523/335

(58) Field of Classification Search ........... 430/137.14; 523/335

See application file for complete search history.

(56) References Cited

U.S. PATENT DOCUMENTS

| | | | | |
|---|---|---|---|---|
| 5,290,654 | A | 3/1994 | Sacripante et al. | 430/137 |
| 5,910,387 | A | 6/1999 | Mychajlowskij et al. | 430/110 |
| 5,916,725 | A | 6/1999 | Patel et al. | 430/137 |
| 5,919,595 | A | 7/1999 | Mychajlowskij et al. | 430/137 |
| 5,922,501 | A | 7/1999 | Cheng et al. | 430/137 |
| 5,925,488 | A | 7/1999 | Patel et al. | 430/137 |
| 5,945,245 | A | 8/1999 | Mychajlowskij et al. | 430/137 |
| 5,977,210 | A | 11/1999 | Patel et al. | 523/161 |
| 5,994,020 | A | 11/1999 | Patel et al. | 430/137 |
| 6,132,924 | A | 10/2000 | Patel et al. | 430/137 |
| 6,268,102 | B1 | 7/2001 | Hopper et al. | 430/137.14 |
| 6,416,920 | B1 | 7/2002 | Hopper et al. | 430/137.14 |
| 6,495,302 | B1 | 12/2002 | Jiang et al. | 430/137.14 |
| 6,500,597 | B1 | 12/2002 | Patel et al. | 430/137.14 |
| 6,541,175 | B1 | 4/2003 | Jiang et al. | 430/137.14 |
| 6,576,389 | B1 | 6/2003 | Vanbesien et al. | 430/137.14 |
| 6,582,873 | B1 * | 6/2003 | Jiang et al. | 430/137.14 |
| 2002/0187415 | A1 | 12/2002 | Jiang et al. | 430/137.14 |
| 2002/0187416 | A1 | 12/2002 | Jiang et al. | 430/137.14 |
| 2003/0180648 | A1 * | 9/2003 | Patel et al. | 430/137.14 |

OTHER PUBLICATIONS

Copending U.S. Appl. No. 10/106,519, filed Mar. 25, 2002, on "Toner Processes" by Raj D. Patel et al.

Copending U.S. Appl. No. 10/106,514, filed Mar. 25, 2002, on "Toner Processes" By Raj D. Patel et al.

* cited by examiner

*Primary Examiner*—John L Goodrow
(74) *Attorney, Agent, or Firm*—E. O. Palazzo

(57) ABSTRACT

A process involving heating a mixture of a colorant dispersion, a latex emulsion, and an optional wax dispersion in the presence of a coagulant containing a metal ion, a base, and an organic sequestering agent, and wherein said heating involves a first heating and a second heating, and wherein the second heating is at a higher temperature than the first heating; and wherein said higher temperature is equal to about or above about the Tg of polymer or resin contained in said latex emulsion.

35 Claims, No Drawings

TONER PROCESSES

RELATED APPLICATIONS AND PATENTS

Illustrated in application U.S. Ser. No. 10/608,330, now U.S. Pat. No. 6,942,954, filed concurrently herewith, the disclosure of which is totally incorporated herein by reference, is a toner process comprised of heating a mixture of an acicular magnetite dispersion, a colorant dispersion, a wax dispersion, a first latex containing a crosslinked resin, and a second latex containing a resin free of crosslinking in the presence of a coagulant to provide aggregates, stabilizing the aggregates with a silicate salt dissolved in a base, and further heating said aggregates to provide coalesced toner particles.

Illustrated in application U.S. Ser. No. 10/603,449, now U.S. Publication No. 20040265727, filed concurrently herewith, the disclosure of which is totally incorporated herein by reference, is a toner process comprised of a first heating of a colorant dispersion, a latex emulsion, and a wax dispersion in the presence of a coagulant containing a metal ion; adding a silicate salt; followed by a second heating.

Illustrated in application U.S. Ser. No. 10/603,321, now U.S. Pat. No. 6,936,396, filed concurrently herewith, the disclosure of which is totally incorporated herein by reference, is a toner process comprised of heating a mixture of an acicular magnetite dispersion, a colorant dispersion, a wax dispersion, a first latex containing a crosslinked resin, a second latex containing a resin substantially free of crosslinking, a coagulant and a silica, and wherein the toner resulting possesses a shape factor of from about 120 to about 150.

Illustrated in U.S. Pat. No. 6,541,175, filed Feb. 4, 2002 on Toner Processes, the disclosure of which is totally incorporated herein by reference, is a process comprising:

(i) providing or generating an emulsion latex comprised of sodio sulfonated polyester resin particles by heating the particles in water at a temperature of from about 65° C. to about 90° C.;

(ii) adding with shearing to the latex (i) a colorant dispersion comprising from about 20 percent to about 50 percent of a predispersed colorant in water, followed by the addition of an organic or an inorganic acid;

(iii) heating the resulting mixture at a temperature of from about 45° C. to about 65° C. followed by the addition of a water insoluble metal salt or a water insoluble metal oxide thereby releasing metal ions and permitting aggregation and coalescence, optionally resulting in toner particles of from about 2 to about 25 microns in volume average diameter; and optionally (iv) cooling the mixture and isolating the product.

Illustrated in U.S. Pat. No. 6,576,597, filed Oct. 15, 2001 on Toner Coagulant Processes, the disclosures of which are totally incorporated herein by reference, is a process for the preparation of toner comprising mixing a colorant dispersion, a latex emulsion, a wax dispersion and coagulants comprising a colloidal alumina coated silica, and a polymetal halide.

The appropriate components, such as for example, waxes, coagulants, resin latexes, surfactants, and colorants, and processes of the above copending applications may be selected for the present invention in embodiments thereof.

BACKGROUND

This invention relates to toner processes, and more specifically, to aggregation and coalescence processes. Yet, more specifically, the present invention relates in embodiments to methods for the preparation of toner compositions by a chemical process, such as emulsion aggregation wherein latex particles are aggregated with a wax and colorants, in the presence of a coagulant like a polymetal halide, or alternatively a mixture of coagulants or flocculating agents to provide toner size aggregates, thereafter adding a base such as sodium hydroxide to stabilize the aggregates from further growth, followed by the addition of an organic sequestering or a chelating agent; and a toner process wherein heating of the toner mixture is accomplished above the resin Tg to provide toner size particles wherein the toner contains about 10 to about 30 percent of a coagulant metal ion, and wherein about 90 to about 70 percent of the metal ion is sequestered or extracted into the aqueous phase or the mother liquor. Also disclosed is the use of a number of sequestering agents to provide toners that developed documents with high gloss of, for example, from about 60 to about 85 ggu.

A number of advantages are associated with the present invention in embodiments thereof including, for example, providing a toner with excellent hot offset, for example above about 210° C., and more specifically, from about 210° C. to about 230° C.; a toner fusing latitude of from about 20° C. to about 35° C. wherein the fusing latitude refers, for example, to a temperature at which, when a developed image is fused, evidences substantially no toner or image offset either to the substrate that the image is fused on, referred to as "Cold" offset or a toner or image offset on the fuser roll referred to as the "HOT" offset; a minimum fixing temperature of, for example, about 160° C. to about 185° C.; and extended photoreceptor life since the toner fusing temperature can be below about 185° C., such as from about 160° C. to about 180° C.

REFERENCES

In U.S. Pat. No. 6,132,924, the disclosure of which is totally incorporated herein by reference, there is illustrated a process for the preparation of toner comprising mixing a colorant a latex, and a coagulant, followed by aggregation and coalescence, wherein the coagulant may be a polyaluminumchloride.

In U.S. Pat. No. 6,268,102, the disclosure of which is totally incorporated herein by reference, there is illustrated a process for the preparation of toner comprising mixing a colorant a latex, and a coagulant, followed by aggregation and coalescence, wherein the coagulant may be a polyaluminum sulfosilicate.

Illustrated in U.S. Pat. No. 6,495,302, the disclosure of which is totally incorporated herein by reference, is a process for the preparation of toner comprising (i) generating a latex emulsion of resin, water, and an ionic surfactant, and a colorant dispersion of a colorant, water, an ionic surfactant, or a nonionic surfactant, and wherein (ii) the latex emulsion is blended with the colorant dispersion;

(iii) adding to the resulting blend containing the latex and colorant a coagulant of a polyaluminumchloride with an opposite charge to that of the ionic surfactant latex colorant;

(iv) heating the resulting mixture below or equal to about the glass transition temperature (Tg) of the latex resin to form aggregates;

(v) optionally adding a second latex comprised of submicron resin particles suspended in an aqueous phase (iv) resulting in a shell or coating wherein the shell is optionally of from about 0.1 to about 1 micron in thickness, and wherein optionally the shell coating is contained on 100 percent of the aggregates;

(vi) adding an organic water soluble or water insoluble chelating component to the aggregates of (v) particles, followed by adding a base to change the resulting toner aggregate mixture from a pH which is initially from about 1.9 to about 3 to a pH of about 5 to about 9;

(vii) heating the resulting aggregate suspension of (vi) above about the Tg of the latex resin;

(viii) optionally retaining the mixture (vii) at a temperature of from about 70° C. to about 95° C.;

(ix) changing the pH of the (viii) mixture by the addition of an acid to arrive at a pH of about 1.7 to about 4; and (x) optionally isolating the toner.

Illustrated in U.S. Pat. No. 6,500,597, the disclosure of which is totally incorporated herein by reference, is a process comprising (i) blending a colorant dispersion of a colorant, water, and an anionic surfactant, or a nonionic surfactant with (ii) a latex emulsion comprised of resin, water, and an ionic surfactant;

(iii) adding to the resulting blend a first coagulant of polyaluminum sulfosilicate (PASS) and a second cationic co-coagulant having an opposite charge polarity to that of the latex surfactant;

(iv) heating the resulting mixture below about the glass transition temperature (Tg) of the latex resin;

(v) adjusting with a base the pH of the resulting toner aggregate mixture from a pH which is in the range of about 1.8 to about 3 to a pH range of about 5 to about 9;

(vi) heating above about the Tg of the latex resin;

(vii) changing the pH of the mixture by the addition of a metal salt to arrive at a pH of from about 2.8 to about 5; and (viii) optionally isolating the product.

Also of interest is U.S. Pat. No. 6,416,920, the disclosure of which is totally incorporated herein by reference, which illustrates a process and which patent discloses, for example, the preparation of toner comprising mixing a colorant, a latex, and a silica, which silica is coated with an alumina.

Emulsion/aggregation/coalescing toner processes for the preparation of toners are illustrated in a number of Xerox patents, the disclosures of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797; and also of interest may be U.S. Pat. Nos. 5,348,832; 5,405,728; 5,366,841; 5,496,676; 5,527,658; 5,585,215; 5,650,255; 5,650,256 and 5,501,935; 5,723,253; 5,744,520; 5,763,133; 5,766,818; 5,747,215; 5,827,633; 5,853,944; 5,804,349; 5,840,462; 5,869,215; 5,869,215; 5,863,698; 5,902,710; 5,910,387; 5,916,725; 5,919,595; 5,925,488 and 5,977,210. The components and processes of the Xerox patents can be selected for the present invention in embodiments thereof.

U.S. Pat. No. 5,922,501, the disclosure of which is totally incorporated herein by reference, illustrates a process for the preparation of toner comprising blending an aqueous colorant dispersion and a latex resin emulsion, and which latex resin is generated from a dimeric acrylic acid, an oligomer acrylic acid, or mixtures thereof and a monomer; heating the resulting mixture at a temperature about equal, or below about the glass transition temperature (Tg) of the latex resin to form aggregates; heating the resulting aggregates at a temperature about equal to, or above about the Tg of the latex resin to effect coalescence and fusing of the aggregates; and optionally isolating the toner product, washing, and drying.

U.S. Pat. No. 5,945,245, the disclosure of which is totally incorporated herein by reference, illustrates a surfactant free process for the preparation of toner comprising heating a mixture of an emulsion latex, a colorant, and an organic complexing agent.

SUMMARY

It is a feature of the present invention to provide a toner process wherein the sequestering or extraction of a coagulant metal ion, such as aluminum, which can crosslink is accomplished with an organic acid based sequestering agent, which agent functions, for example, at a pH of above about 5 and transforms aluminum, a porous solid, into a water insoluble aluminum-organic complex, and wherein there is aggregated a latex emulsion, wax particles, and colorant particles in the presence of a metal halide, such as polyaluminumchloride, at a initial pH of about 2.5 to provide the desired toner size aggregates with a narrow GSD to which is added a base, such as sodium hydroxide, thereby increasing the pH to about 7 to stabilize the aggregates from further growth, followed by the addition of an organic sequestering or a chelating agent, such as ethylene diamine tetra acetic acid (EDTA), and heating the composite above the Tg of the latex to coalesce or fuse the aggregates. For example, from about 0.05 to about 0.3 pph by weight of toner of the coagulant metal ion can be selected to provide for toner particle size control irrespective of the amount of crosslinking. In specific embodiments the organic sequestering agent is added after the pH of the aggregate is increased to a pH of about 7 and before the aggregates are heated to coalesce the latex into toner particles.

Aspects of the present invention relate to a toner process comprised of a first heating of a mixture of an aqueous colorant dispersion, an aqueous latex emulsion, and an aqueous wax dispersion in the presence of a coagulant to provide aggregates, adding a base followed by adding an organic sequestering agent, and thereafter accomplishing a second heating, and wherein the first heating is below about the latex polymer glass transition temperature (Tg), and the second heating is above about the latex polymer glass transition temperature; a process comprised of heating a mixture of a colorant dispersion, and a latex emulsion in the presence of a coagulant, a base, and an organic sequestering agent, and wherein the heating involves a first heating and a second heating, and wherein the second heating is at a higher temperature than the first heating; and wherein the higher temperature is equal to about or above about the Tg of polymer or resin contained in the latex emulsion; a process comprised of heating a mixture of a colorant dispersion, a latex emulsion, and an optional wax dispersion in the presence of a coagulant containing a metal ion, a base, and an organic sequestering agent, and wherein the heating involves a first heating and a second heating and wherein the second heating is at a higher temperature that the first heating; and wherein the higher temperature is equal to about or above about the Tg of polymer or resin contained in the latex emulsion; processes wherein there is selected an organic sequestering agent, such as EDTA, sodium glutonate, and the like, to sequester or extract a metal complexing ion such as aluminum; a process for preparing a high gloss toner comprised of a latex emulsion polymer, a colorant, and a wax, by aggregating these components with a coagulant, such as a polyaluminumchloride, wherein the aluminum ion forms ionomer crosslinks with, for example, a carboxylic acid (—COOH) group of the resin originating from the acid functionality into the latex, and which aluminum crosslinking has an effect on (the higher the degree of crosslinking the lower the gloss) toner rheology and can contribute to a loss in toner gloss when compared to a toner generated without the aluminum crosslinks; a process for generating toner particles by blending a latex emulsion comprised of resin particles, a pigment dispersion and a wax dispersion, and which process is accomplished in the presence of a coagulant to ensure that substantially all the components of, for example, the resin, colorant, and wax, including an optional second latex will be totally, for example about 98 to about 100 percent, retained in the latex-wax-pigment aggregates, followed by heating to a temperature below the resin Tg, adding a second latex to form a shell over the formed aggregates, followed by the addition of a base to provide colloidal stability to the aggregates to minimize further aggregation when the temperature is raised above the resin Tg to coalesce the aggregates; a toner process involving extraction of, for example, aluminum ions with ethylene diamine tetra acetic acid (EDTA) which is added after the base is introduced, followed by heating to a temperature above the resin Tg to coalesce the aggregates into toner size smooth particles; a process wherein optionally the toner size aggregates are stabilized by a base to which is then added a sequestering agent which is dissolved in a base, followed by further adjustment with a base to arrive at the final stabilizing pH of, for example, 7; a process wherein the sequestering agent is added to prevent or minimize breakdown of aggregates resulting in fines; a high gloss toner process comprising mixing a colorant dispersion, a latex emulsion, and a wax dispersion in the presence of a coagulant containing a metal ion to provide aggregates to which is added an organic sequestering agent to extract the metal ion during coalescence; a process wherein (i) the colorant dispersion contains a pigment, water and an anionic surfactant, or a nonionic surfactant, and wherein a wax dispersion is added comprised, for example, of submicron Wax particles of from about 0.1 to about 0.5 micron in diameter by volume, and which wax is dispersed in water and an anionic surfactant to provide a mixture containing colorant, and a wax;

(ii) wherein the mixture of (i) is blended with a latex emulsion comprised of submicron resin particles of about 150 to about 300 nanometers in diameter, and containing water, an anionic surfactant or a nonionic surfactant, to provide a blend of colorant, wax and resin;

(iii) wherein the resulting blend possesses a pH of about 2.1 to about 2.8 and to which blend is added a coagulant, such as a polymetal halide, to initiate flocculation or aggregation of the blend components of (ii);

(iv) heating the resulting mixture of (iii) below about the glass transition temperature (Tg) of the latex resin to form toner sized aggregates;

(v) adding to the formed toner aggregates (first portion amount of about 60 to about 90 percent, and the second portion amount of about 40 to about 10 percent) a second portion of a latex comprised of resin suspended in an aqueous phase containing an ionic surfactant and water, and stirring for a period of time to permit stabilization of the aggregate particle size;

(vi) adding to the resulting mixture of (v) an aqueous solution of a base to thereby change the pH, which is initially from about 2 to about 2.8, to arrive at a pH of from about 6.5 to about 7 followed immediately by the addition of an organic sequestering agent and allowing the mixture to stir for a period of 5 minutes;

(vii) heating the resulting aggregate mixture of (vi) above about the Tg of the latex (i);

(viii) retaining the mixture temperature at from about 85° C. to about 95° C. and allowing the pH to decrease to a value of about 6, and then stirring for an period of about 300 minutes;

(ix) optionally reducing the pH by the addition of an acid after 60 minutes to a pH of about 4.5, and heating for a period of an additional 180 minutes increase the coalescence rate by a factor of about 2 to about 3, and to assist the fusion or coalescence of the toner aggregates and to obtain smooth particles;

(x) washing the resulting toner slurry; and (xi) isolating and drying the toner; a process of preparing a high gloss toner in the presence of a coagulant, such as a polymetal halide of, for example, a polyaluminumchloride, heating to provide toner size aggregates stabilized by a base, followed by the addition of a sequestering or a metal ion extraction agent, and further heating the aggregates to provide coalesced particles; a toner process wherein the resin carboxylate groups are ionized at a pH of equal to or greater than about 4 and the labile aluminum form strong ionomer links with the ionized COO groups at elevated temperatures; a process wherein the addition of the organic sequester is after the pH is adjusted from about 2.5 to about 7 and before the slurry is heated; a process wherein the colorant dispersion is comprised of a pigment of about 0.05 to about 0.3 micron volume diameter size dispersed in water containing an anionic surfactant, and a latex emulsion comprised of resin particles of about 0.1 to about 0.4 micron in volume diameter, in water and an anionic surfactant, and a wax dispersion comprised of wax particles of about 0.1 to about 0.3 micron in volume diameter dispersed in water, and an anionic surfactant, then aggregated in the presence of a coagulant, heating in the presence of an organic sequestering agent to provide a toner for high gloss applications; a process wherein the coagulant is a polymetal halide, such as a polyaluminumchloride, selected in an amount of about 0.02 to about 0.2 pph by weight of toner; a process wherein the coagulant containing the metal ion polymetalhalide if not removed crosslinks with the resin resulting in a reduction of gloss; a process wherein the sequestering or chelating agent, such as EDTA, is added in an amount of about 0.5 to about 2 pph; a process wherein the sequestering agent complexes or chelates with the coagulant metal ion, such as aluminum, thereby extracting the metal ion from the toner aggregate particles; a process wherein the amount of the sequestering agent added controls the amount of the metal ion extracted from the toner particles to provide controlled crosslinking, for example adding about 0.5 pph of the sequestering agent, such as EDTA, by weight of toner extracts, about 40 to about 60 percent of the aluminum ions and permits a gloss of about 40 to about 60 ggu, and the use of about 1 pph of EDTA results in about 95 to about 100 percent extraction of the aluminum and a gloss of about 60 to about 80 ggu; a process for providing a high gloss toner comprising (i) generating a colorant dispersion comprising a pigment, water and an anionic surfactant, a latex emulsion comprised of submicron resin particles dispersed in water and an anionic surfactant, and a wax dispersion which is added comprised of submicron wax particles and which wax is dispersed in water and an anionic surfactant to provide a mixture containing colorant, resin, and a wax;

(ii) wherein the resulting mixture is blended with a latex emulsion comprised of submicron resin particles of about 200 to about 300 nanometers in diameter containing water, an anionic surfactant or a nonionic surfactant;

(iii) wherein the resulting blend possesses a pH of about 2.2 to about 2.8 to which blend is added a coagulant to initiate flocculation or aggregation of the blend components of (ii);

(iv) heating the resulting mixture of (iii) below about the glass transition temperature (Tg) of the latex resin to form toner sized aggregates;

(v) adding to the formed toner aggregates a second portion of the latex comprised of resin suspended in an aqueous phase containing an ionic surfactant and water, and stirring for a period of time to permit stabilization of the aggregate particle size;

(vi) adding to the resulting mixture of (v) an aqueous solution of a base, such as sodium hydroxide, to thereby change the pH, which is initially from about 2 to about 2.8, to arrive at a pH of from about 6.5 to about 7 followed immediately by the addition of an organic sequestering agent, such as EDTA, and allowing the mixture to stir;

(vii) heating the resulting aggregate mixture of (vi) about above the Tg of the latex of (i);

(viii) retaining the mixture temperature at from about 80° C. to about 95° C., and allowing the pH to decrease to a value of about 6, and then stirring for an period of about 300 minutes;

(ix) optionally reducing the pH of the mixture of (viii) by the addition of an acid after, for example, 60 minutes to a pH of about 4.5 and heating for a period of an additional 180 minutes to increase the coalescence rate;

(x) washing the resulting toner slurry; and (xi) isolating and drying the toner particles; a process wherein the sequestering or chelating agents, such as EDTA, are efficient in complexing with metal ions such as aluminum, calcium, magnesium, manganese; generally such reactions may not be reversible as may be the situation when an inorganic sequestering agent, such as silicate salt, is selected; a process wherein the toner obtained possesses a minimum fix temperature (MFT) of about 160° C. to about 185° C.; a process wherein the toner obtained hot offset temperature (HOT) is in excess of about 210° C.; a process wherein the latex resin particles are from about 0.15 to about 0.3 micron in volume average diameter and are dispersed in water containing an anionic surfactant; a process wherein the colorant is carbon black of a size of about 0.01 to about 0.2 micron in average volume diameter dispersed in water containing an anionic surfactant and wax particles of about 0.1 to about 0.5 micron in average volume diameter dispersed in water containing an anionic surfactant; a process wherein the colorant is a pigment selected in an amount of about 3 to about 10 percent by weight, the wax amount is about 5 to about 15 percent by weight of toner, and the latex resin particles amount is about 80 to about 90 percent by weight of toner; a process wherein the acid is selected from the group consisting of nitric, sulfuric, hydrochloric, citric and acetic acid; a process wherein the base is selected from a group consisting of sodium hydroxide, potassium hydroxide, and ammonium hydroxide; a process wherein there is added to the formed toner size aggregates a second portion of latex comprised of submicron resin particles of about 0.1 to about 0.4 micron in diameter suspended in an aqueous phase containing an anionic surfactant, and wherein the second portion of the latex is selected in an amount of from about 10 to about 40 percent by weight of the initial latex to form a shell thereover on the formed aggregates, and which shell is of a thickness of, for example, about 0.2 to about 0.8 micron; a process wherein the added latex contains the same resin as the initial latex of (i), or wherein the added latex contains a dissimilar resin than that of the initial latex; a process wherein the pH of the mixture resulting in (vi) is increased from about 2 to about 2.6 to about 7 to about 7.4 with the addition of a base, such as sodium hydroxide, to further stabilize the aggregates, followed by the addition of a sequestering or a complexing agent in the amount of about 0.1 to about 2 pph, thereafter increasing the temperature of the mixture above the resin Tg; a process wherein temperature of the aggregation (iv) is from about 45° C. to about 60° C., and wherein the coalescence or fusion temperature for (vii) and (viii) is from about 80° C. to about 95° C.; a process wherein the pH of blending and aggregation (ii) to (v) is about 1.8 to about 3, and wherein the pH of the coalescence (viii) and (ix) is from about 4.5 to about 6.5; a process wherein the temperature at which toner sized aggregates are formed controls the size of the aggregates, and wherein the final toner size is from about 5 to about 14 microns in volume average diameter; a process wherein the time of coalescence or fusion is from about 5 to about 10 hours; a process wherein the added second portion of the latex contains the same resin as the initial latex resin of (i), or wherein the added latex contains a dissimilar resin than that of the initial latex; a process wherein the temperature at which toner sized aggregates are formed controls the size of the aggregates, and wherein the final toner size is from about 3 to about 15 microns in volume average diameter; a process wherein the aggregation (iv) temperature is from about 45° C. to about 60° C., and wherein the coalescence or fusion temperature of (vii) and (viii) is from about 80° C. to about 97° C., and wherein the coagulant is a polyaluminum halide; a process wherein the time of coalescence or fusion is from about 4 to about 5 hours, and wherein the toner resulting possesses a smooth morphology; a process wherein the latex contains a resin, or a polymer selected from the group comprised of poly(styrene-alkyl acrylate), poly(styrene-1,3-diene), poly(styrene-alkyl methacrylate), poly(alkyl methacrylate-alkyl acrylate), poly(alkyl methacrylate-aryl acrylate), poly(aryl methacrylate-alkyl acrylate), poly(alkyl methacrylate), poly(styrene-alkyl acrylate-acrylonitrile), poly(styrene-1,3-diene-acrylonitrile), poly(alkyl acrylate-acrylonitrile), poly(styrene-butadiene), poly(methylstyrene-butadiene), poly(methyl methacrylate-butadiene), poly (ethyl methacrylate-butadiene), poly(propyl methacrylate-butadiene), poly(butyl methacrylate-butadiene), poly (methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylonitrile), and poly(styrene-butyl acrylate-acrylononitrile); and a process wherein the resin contains a carboxylic acid selected from the group comprised of acrylic acid, methacrylic acid, itaconic acid, beta carboxy ethyl acrylate, fumaric acid, maleic acid, and cinnamic acid, and wherein a carboxylic acid is selected in an amount of from about 0.1 to about 10 weight percent.

The resin or polymer particles selected for the process of the present invention can be prepared by, for example, emulsion polymerization methods, including semicontinuous emulsion polymerization methods, and the monomers utilized in such processes can be selected from, for example, styrene, acrylates, methacrylates, butadiene, isoprene, and acrylonitrile; monomers comprised of an A and a B monomer wherein from about 75 to about 95 percent of A and from about 5 to about 25 percent of B is selected, wherein A can be, for example, styrene, and B can be, for example, an acrylate, methacrylate, butadiene, isoprene, or an acrylonitrile; and optionally, acid or basic olefinic monomers, such as acrylic acid, methacrylic acid, beta carboxy ethyl acrylate, acrylamide, methacrylamide, quaternary ammonium halide of dialkyl or trialkyl acrylamides or methacrylamide, vinylpyridine, vinylpyrrolidone, vinyl-N-methylpyridinium chloride and the like. The acid or basic groups in the monomer or polymer are present in an amount of, for example, from about 0.1 to about 10 percent by weight of the polymer. Chain transfer agents, such as dodecanethiol or carbon tetrabromide, can also be selected when preparing resin particles by emulsion polymerization. Other processes of obtaining resin particles of, for example, from about 0.01 micron to about 1 micron in diameter can be selected from polymer microsuspension process, such as those illustrated in U.S. Pat. No. 3,674,736, the disclosure of which is totally incorporated herein by reference, polymer solution microsuspension process, such as disclosed in U.S. Pat. No. 5,290,654, the disclosure of which is totally incorporated herein by reference, mechanical grinding processes, or other known processes; and toner processes wherein the resin possesses a crosslinking percentage of from about 1 to about 50 and/or from about 1.5 to about 30.

Colorants include dyes, pigments, and mixtures thereof, colorant examples being illustrated in a number of the copending applications referenced herein, and more specifically, which colorants include known colorants like black, cyan, red, blue, magenta, green, brown, yellow, mixtures thereof, and the like.

Various known colorants, such as pigments, selected for the processes of the present invention and present in the toner in an effective amount of, for example, from about 1 to about 25 percent by weight of toner, and more specifically, in an amount of from about, 3 to about 10 percent by weight include, for example, carbon black like REGAL 330®; REGAL 660®; phthalocyanine Pigment Blue 15, Pigment Blue 15.1, Pigment Blue 15.3, Pigment Green 7, Pigment Green 36, Pigment Orange 5, Pigment Orange 13, Pigment Orange 16, Pigment Orange 36, Pigment Red 122, Pigment Red 53.1, Pigment Red 48.1, Pigment Red 48.2, Pigment Red 49.1, Pigment Red 49.2, Pigment Red 22, Pigment Red 185, Pigment Red 188, Pigment Red 210, Pigment Red 238, Pigment Red 170, Pigment Red 23, Pigment Red 81.2, Pigment Red 81.3, Pigment Red 57, Pigment Red 17, Pigment Red 169, Pigment Violet 19, Pigment Violet 23, Pigment Violet 3, Pigment Violet 27, Pigment Yellow 65, Pigment Yellow 1, Pigment Yellow 83, Pigment Yellow 17, Pigment Yellow 12, Pigment Yellow 14, Pigment Yellow 97, Pigment Yellow 74, Pigment Yellow 3, Pigment Yellow 75, available from Sun Chemicals, PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ available from Hoechst, and CINQUASIA MAGENTA™ available from E.I. DuPont de Nemours and Company, and the like. Generally, colored pigments that can be selected are cyan, magenta, or yellow pigments, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans that may be selected include copper tetra(octadecyl sulfonamido) phthalocyanine, x-copper phthalocyanine pigment identified in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Yellow 180 and Permanent Yellow FGL, wherein the colorant is present, for example, in the amount of about 3 to about 15 weight percent of the toner. Organic dye examples include known suitable dyes, reference the Color Index, and a number of U.S. patents. Organic soluble dye examples, preferably of a high purity, for the purpose of color gamut are Neopen Yellow 075, Neopen Yellow 159, Neopen Orange 252, Neopen Red 336, Neopen Red 335, Neopen Red 366, Neopen Blue 808, Neopen Black X53, Neopen Black X55, wherein the dyes are selected in various suitable amounts, for example from about 0.5 to about 20 percent by weight, and more specifically, from about 5 to about 20 weight percent of the toner. Colorants include pigment, dye, mixtures of pigment and dyes, mixtures of pigments, mixtures of dyes, and the like.

Examples of anionic surfactants include, for example, sodium dodecylsulfate (SDS), sodium dodecylbenzene sulfonate, sodium dodecyinaphthalene sulfate, dialkyl benzenealkyl, sulfates and sulfonates, abitic acid, available from Aldrich Chemicals, NEOGEN RK™, NEOGEN SC™ available from Kao Inc., and the like. An effective concentration of the anionic surfactant is, for example, from about 0.01 to about 10 percent by weight, and more specifically, from about 0.1 to about 5 percent by weight of, for example, monomers used to prepare the toner polymer.

Examples of nonionic surfactants that may be, for example, included in the resin latex dispersion include, for example, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhodia as IGEPAL CA-210®, IGEPAL CA-520®, IGEPAL CA-720®, IGEPAL CO-890®, IGEPAL CO-720®, IGEPAL CO-290®, IGEPAL CA-210®, ANTAROX 890® and ANTAROX 897®. A suitable concentration of the nonionic surfactant is, for example, from about 0.01 to about 10 percent by weight, and preferably from about 0.1 to about 5 percent by weight of monomers used to prepare the toner polymer resin.

Organic sequestering agent examples include ethylene diamine tetra acetic acid (EDTA), gluconal, sodium gluconate, potassium and sodium citrate, nitrotriacetate (NTA) salt, GLDA (commercially available L-glutamic acid N,N diacetic acid) humic and fulvic acids, maltol and ethyl-maltol, peta-acetic and tetra-acetic acids; a number of water soluble polymers [polyelectrolytes] that contain both COOH and OH functionalities, and more specifically, EDTA. Examples of specific sequestering agents are

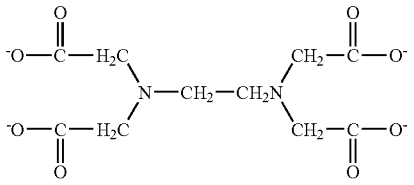

EDTA

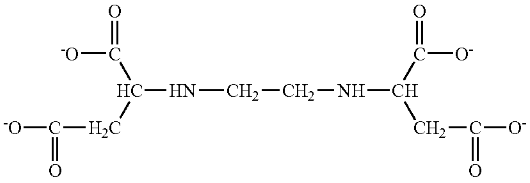

and

EDDS

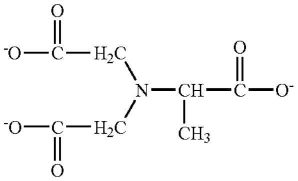

MGDA

Counterionic coagulants may be selected for the toner processes illustrated herein, and can be comprised of organic, or inorganic entities and the like. For example, in embodiments the ionic surfactant of the resin latex dispersion can be an anionic surfactant, and the counterionic coagulant can be a polymetal halide (PAC) or a polymetal sulfo silicate (PASS). Coagulants that can be included in the toner in amounts of, for example, from about 0.05 to about 10 weight percent include polymetal halides, polymetal sulfosilicates monovalent, divalent or multivalent salts optionally in combination with cationic surfactants, and the like. Inorganic cationic coagulants include, for example, polyaluminumchloride (PAC), polyaluminum sulfosilicate (PASS), aluminum sulfate, zinc sulfate, or magnesium sulfate. These multivalent counterions provide a crosslinking mechanism resulting in the resin to become partially crosslinked and when stabilized only by a base, show more than 90 percent retention of the ion and hence a reduction in gloss is observed.

Examples of waxes include those as illustrated herein, such as those of the aforementioned copending applications, polypropylenes and polyethylenes commercially available from Allied Chemical and Petrolite Corporation, wax emulsions available from Michaelman Inc. and the Daniels Products Company, EPOLENE N-15™ commercially available from Eastman Chemical Products, Inc., VISCOL 550-P™, a low weight average molecular weight polypropylene available from Sanyo Kasei K.K., and similar materials. The commercially available polyethylenes that can be selected possess, it is believed, a molecular weight $M_w$ of from about 1,000 to about 5,000, and the commercially available polypropylenes are believed to possess a molecular weight of from about 4,000 to about 10,000. Examples of functionalized waxes include amines, amides, for example AQUA SUPERSLIP 6550™, SUPERSLIP 6530™ available from Micro Powder Inc., fluorinated waxes, for example POLYFLUO 190™, POLYFLUO 200™, POLYFLUO 523XF™, AQUA POLYFLUO 411™, AQUA POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, chlorinated polypropylenes and polyethylenes available from Allied Chemical and Petrolite Corporation and SC Johnson Wax.

The coagulant is in embodiments present, for example, in an aqueous medium in an amount of from, for example, about 0.05 to about 10 percent by weight, and more specifically, in an amount of from about 0.075 to about 2 percent by weight. The coagulant may also contain minor amounts of other components such as, for example, nitric acid. The coagulant is usually added slowly into the blend of latex, colorant, and wax while continuously subjecting the blend to a high shear, for example, by stirring with a blade operating at about 3,000 to about 10,000 rpm, and more specifically about 5,000 rpm, for about 1 to about 120 minutes. A high shearing device, for example an intense homogenization device, such as the in-line IKA SD-41, may be used to ensure that the blend is homogeneous and uniformly dispersed.

In embodiments of the present invention, the multi-stage addition of latex is conducted, a second portion used, for example about 15 to about 45 percent of the total amount of latex, is retained while the remainder is subjected to homogenization and aggregation. In these embodiments, a majority of the latex is added at the onset while the remainder of the latex (the delayed latex) is added after the formation of the aggregate, and wherein the delayed addition of the latex provides in embodiments an outer shell of a nonpigmented material coating on the magnetite/colorant core, thereby encapsulating the pigment or colorant.

In embodiments, the obtained toner particles possess, for example, an average volume diameter of from about 0.5 to about 25, and more specifically, from about 1 to about 10 microns, and narrow GSD characteristics of, for example, from about 1.05 to about 1.25, or from about 1.15 to about 1.25 as measured by a Coulter Counter. The toner particles also possess an excellent shape factor, for example, of 135 or less wherein the shape factor refers, for example, to the measure of toner smoothness and toner roundness, where a shape factor of about 100 is considered spherical and smooth without any surface protrusions, while a shape factor of about 150 is considered to be rough in surface morphology.

The toner particles illustrated herein may also include known charge additives in effective amounts of, for example, from about 0.1 to about 5 weight percent, such as alkyl pyridinium halides, bisulfates, the charge control additives of U.S. Pat. Nos. 3,944,493; 4,007,293; 4,079,014; 4,394,430 and 4,560,635, the disclosures of which are totally incorporated herein by reference, and the like. Surface additives that can be added to the toner compositions after washing or drying include, for example, metal salts, metal salts of fatty acids, colloidal silicas, metal oxides, mixtures thereof and the like, which additives are usually present in an amount of from about 0.1 to about 2 weight percent, reference U.S. Pat. Nos. 3,590,000; 3,720,617; 3,655,374 and 3,983,045, the disclosures of which are totally incorporated herein by reference. Specific additives include zinc stearate and AEROSIL R972® available from Degussa Chemical and present in an amount of from about 0.1 to about 2 percent which can be added during the aggregation process or blended into the formed toner product.

Developer compositions can be prepared by mixing the toners obtained with the process of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration.

The following Examples are provided. Parts and percentages are by weight unless otherwise indicated and temperatures are in degrees Centigrade.

EXAMPLES

Preparation of Linear Latex A:

A latex emulsion (i) comprised of polymer particles generated from the emulsion polymerization of styrene, butyl acrylate and beta carboxy ethyl acrylate (Beta CEA) was prepared as follows. A surfactant solution of 434 grams of DOWFAX 241™ (anionic emulsifier −55 percent active ingredients) and 387 kilograms of deionized water was prepared by mixing these components for 10 minutes in a stainless steel holding tank. The holding tank was then purged with nitrogen for 5 minutes before transferring the mixture into a reactor. The reactor was then continuously purged with nitrogen while being stirred at 100 RPM. The reactor was then heated to 80° C.

Separately, 6.11 kilograms of ammonium persulfate initiator were dissolved in 30.2 kilograms of deionized water. Also, separately a monomer emulsion A was prepared in the following manner. 315.7 Kilograms of styrene, 91.66 kilograms of butyl acrylate, 12.21 kilograms of beta-CEA, 7.3 kilograms of 1-dodecanethiol, 1.42 kilograms of decanediol diacrylate (ADOD), 8.24 kilograms of DOWFAX™ (anionic surfactant), and 193 kilograms of deionized water were mixed to form an emulsion. Five percent of the above emulsion was then slowly fed into the reactor containing the above prepared aqueous surfactant phase at 80° C. to form seeds wherein "seeds" refer, for example, to the initial emulsion latex added to the reactor prior to the addition of the initiator solution, while being purged with nitrogen. The above initiator solution was then slowly charged into the reactor forming about 5 to about 12 nanometers of latex "seed" particles. After 10 minutes, the remainder of the emulsion was continuously fed in using metering pumps.

After the above monomer emulsion was charged into the main reactor, the temperature was maintained at 80° C. for an additional 2 hours to complete the reaction. The reactor contents were then cooled down to about 25° C. The resulting isolated product was comprised of 40 weight percent of submicron, 0.5 micron diameter resin particles of styrene/butylacrylate/beta CEA suspended in an aqueous phase containing the above surfactant. The molecular properties resulting for the resin latex were $M_W$ (weight average molecular weight) of 35,000, $M_n$ of 10.6, as measured by a Gel Permeation Chromatograph, and a midpoint Tg of 55.8° C., as measured by a Differential Scanning Calorimeter, where the midpoint Tg is the halfway point between the onset and the offset Tg of the polymer.

Wax and Pigment Dispersions:

An aqueous wax dispersion utilized in the following Examples was generated using waxes available from Baker-Petrolite; (1) P725 polyethylene wax with a low molecular weight $M_W$ of 725, and a melting point of 104° C., or (2) P850 wax with a low molecular weight of 850 and a melting point of 107° C. and NEOGEN RK™ as an anionic surfactant/dispersant. The wax particle diameter size was determined to be approximately 200 nanometers, and the wax slurry solid loading was 30 percent (weight percent throughout).

Pigment Dispersions:

The pigment dispersion, obtained from Sun Chemicals, was comprised of an aqueous dispersion containing 18 percent by weight of Pigment Blue 15.3, an anionic surfactant, 2 percent, and 80 percent water. Similarly, other colorant dispersions of magenta, black, and yellow available from Sun Chemicals can be selected.

Example I

64 Grams of cyan pigment P.B. 15.3 having a particle size of about 0.15 micron dispersed in water and an anionic surfactant were added to 600 grams of water. To the resulting pigment dispersion were added 60 grams of a dispersion of the above submicron polyethylene P725 wax particles (30 percent solids) followed by the addition of 286 grams of the above prepared anionic Latex A comprising submicron latex particles (40 percent solids) of styrene/butylacrylate/beta CEA, and then the resulting mixture was polytroned at speed of 5,000 rpm. There was then added an aqueous PAC coagulant solution comprising 2.8 grams (equivalent of 0.14 pph by weight of toner) of 10 percent solids placed in 28 grams of 0.3 M nitric acid and polytroned for a period of 5 minutes.

The resulting blend was then heated to a temperature of 52° C. while stirring for a period of 105 minutes to obtain a particle size of 5.1 microns with a GSD of 1.21. 138 Grams of the above latex A were then added to the aggregate mixture and stirred at 52° C. for an additional 30 minutes to provide a particle size of 5.7 microns and a GSD of 1.19. The aggregate mixture was then stabilized from further growth by changing the pH of the mixture from about 2.6 to about 7 followed by the addition of 3 grams of EDTA which is the equivalent of 1.5 pph of EDTA by weight of toner.

The resulting mixture was then heated to 95° C. After 45 minutes at 95° C., the particle size measured was 5.7 microns and the GSD was 1.19. The pH when measured by a pH meter was found to be 6.5. The reactor was heated for a total of 240 minutes to obtain a particle size of 5.7 microns and a GSD of 1.20. The resultant mixture was cooled and the toner obtained was washed 6 times in the following manner. The first wash was conducted at a pH of 10 at a temperature of 60° C., followed by 3 washes with deionized water at room temperature, followed by a pH 4 wash at a temperature of 40° C., and finally a DIW (dionized water) wash at room temperature and then dried on a freeze dryer. The resulting toner was comprised of 86 percent (percent by weight throughout) resin, 5 percent pigment, and 9 percent wax. The resulting toner had an aluminum content of 90 ppm by weight of toner indicating that more than 90 percent of the aluminum was extracted or sequestered out. The shape factor of the toner was 125 where a SF of 100 is considered very smooth and spherical in shape, a SF of 145 is considered irregular in shape with a rough morphology, a SF of 125 of a potato shape with a smooth surface. The fusing of the toner, a known free nip belt fuser (FNBF), indicated that the toner had a gloss of about 70 ggu at 160° C. which was about 30 ggu higher than a toner which contained about 80 to about 95 percent of the aluminum.

Example II

Cyan Toner—1 pph EDTA, 12 Percent Wax:

64 Grams of cyan pigment P.B. 15.3 comprised of 17 percent solids having a particle size of about 0.15 micron dispersed in water and an anionic surfactant were added to 600 grams of water. To the resulting pigment dispersion were added 80 grams of a dispersion of the above submicron polyethylene P725 wax particles (30 percent solids) followed by the addition of 271 grams of the above prepared anionic Latex A comprising submicron latex particles (40 percent solids) of styrene/butylacrylate/beta CEA, and then the resulting mixture was polytroned at speeds of 5,000 rpm to which was added an aqueous PAC coagulant solution comprising 2.8 (equivalent of 0.14 pph by weight of toner) grams of 10 percent solids placed in 28 grams of 0.3 M nitric acid and polytroned for a period of 5 minutes.

The resulting blend was then heated to a temperature of 50° C. while stirring for a period of 120 minutes to obtain a particle size of 4.6 microns (diameter in microns throughout) with a GSD of 1.20. 138 Grams of the above latex A were then added to the aggregate mixture and stirred at 50° C. for an additional 60 minutes to provide a particle size of 5.6 and a GSD of 1.21. The aggregate mixture was then stabilized from further growth by changing the pH of the mixture from about 2.6 to about 6.8 followed by the addition of 2 grams of EDTA which is equivalent of 1 pph of EDTA by weight of toner.

The resulting mixture was then heated to 95° C. After 100 minutes at 95° C., the minimal particle size measured 5.5 microns and the GSD was 1.20. The pH was maintained at 6.4 for a period of 300 minutes resulting in a particle size of 5.6 microns and a GSD of 1.20. The resultant mixture was cooled and the toner obtained was washed 6 times in the following manner. The first wash was conducted at a pH of 10 at a temperature of 60° C., followed by 3 washes with deionized water at room temperature, followed by a pH 4 wash at a temperature of 40° C., and finally a DIW wash at room temperature and dried on a freeze dryer. The resulting toner was comprised of 83 percent resin, 5 percent pigment, and 12 percent wax. The resulting toner had an aluminum content of 150 ppm by weight of toner indicating about 90 percent of the aluminum was extracted out of the toner. The shape factor of the toner was 122 where a SF of 100 is considered very smooth and spherical in shape while a SF of 145 is considered irregular in shape with a rough morphology, while a SF of 125 of a potato shape with a smooth surface. The fusing of the toner on a free nip belt fuser (FNBF) indicated that the toner had a gloss of about 31 ggu at 160° C. which was about 30 ggu higher than a toner which retained about 80 to about 95 percent of the aluminum used in the preparation of the toner.

Example III

Cyan Toner—0.5 pph EDTA, 12 Percent Wax:

64 Grams of cyan pigment P.B. 15.3 comprised of 17 percent solids and with a particle size of about 0.15 micron and dispersed in water and an anionic surfactant were added to 600 grams of water. To the resulting pigment dispersion were added 80 grams of a dispersion of the above submicron polyethylene P725 wax particles (30 percent solids) followed by the addition of 271 grams of the above prepared anionic latex A comprising submicron latex particles (40 percent solids) of styrene/butylacrylate/beta CEA, and then the resulting mixture polytroned at a speed of 5,000 rpm to which was added an aqueous PAC coagulant solution comprising 3.6 (equivalent of 0.18 pph by weight of toner) grams of 10 percent solids placed in 28 grams of 0.3 M nitric acid and polytroned for a period of 5 minutes.

The resulting blend was then heated to a temperature of 50° C. while stirring for a period of 120 minutes to obtain a particle size of 5.2 with a GSD of 1.20. 138 Grams of the above latex A were then added to the aggregate mixture and stirred at 50° C. for an additional 60 minutes to provide a particle size of 5.8 and a GSD of 1.19. The aggregate mixture was then stabilized from further growth by changing the pH of the mixture from about 2.6 to about 6.8 followed by the addition of 1 gram of EDTA which is equivalent of 0.5 pph of EDTA by weight of toner.

The resulting mixture was then heated to 95° C. After 90 minutes at 95° C., the particle size measured was 5.9 microns and the GSD was 1.19. The pH was maintained at 6 for a period of 300 minutes resulting in a particle size of 6 microns and a GSD of 1.19. The resultant mixture was cooled and the toner obtained was washed 6 times in the manner described in Example I, and dried on a freeze dryer. The resulting toner was comprised of 83 percent resin, 5 percent pigment, and 12 percent wax. The resulting toner had an aluminum content of 550 ppm by weight of toner indicating about 65 percent of the aluminum was extracted or removed from the toner. The shape factor of the toner was 123 where a SF of 100 is considered very smooth and spherical in shape a SF of 145 is considered irregular in shape with a rough morphology, a SF of 125 is of a potato shape with a smooth surface. The circularity as measured on the Sysmex FPIA 2100 instrument was. 0.956, that is the toner particles were round; 1 is a perfect sphere. The fusing of the toner on a free nip belt fuser (FNBF) (Xerox Corporation DocuColor 2240) showed that the toner had a gloss of about 50 ggu at 160° C. which was about 10 ggu higher than a toner which retained about 80 to about 95 percent of the aluminum used in the preparation of the toner.

Example IV

Magenta Toner—(7 Percent):

82.5 Grams of magenta pigment PR 122:PR 238 in a ratio of 50:50 and comprised of 17 percent solids having a particle size of about 0.15 to about 0.2 micron dispersed in water and an anionic surfactant were added to 600 grams of water. To the resulting pigment dispersion were added 80 grams of a dispersion of the above submicron polyethylene P725 wax particles (30 percent solids) followed by the addition of 271 grams of the above prepared anionic latex A comprising submicron latex particles (40 percent solids) of styrene/butylacrylate/beta CEA, and then the resulting mixture polytroned at speeds of 5,000 rpm to which was added an aqueous PAC coagulant solution comprising 3.6 (equivalent of 0.18 pph by weight of toner) grams of 10 percent solids placed in 28 grams of 0.3 M nitric acid and polytroned for a period of 5 minutes.

The resulting blend was then heated to a temperature of 50° C. while stirring for a period of 120 minutes to obtain a particle size of 4.8 with a GSD of 1.20. 138 Grams of the above latex A were then added to the aggregate mixture and stirred at 50° C. for an additional 45 minutes to provide a particle size of 5.5 and a GSD of 1.20. The aggregate mixture was then stabilized from further growth by changing the pH of the mixture from about 2.6 to about 7 followed by the addition of 2 grams of EDTA, which is the equivalent of 1 pph of EDTA by weight of toner.

The resulting mixture was then heated to 95° C. After 100 minutes at 95° C., the particle size measured was 5.6 microns and the GSD was 1.20. The pH was maintained at 6 for a period of 300 minutes resulting in a particle size of 5.7 microns and a GSD of 1.19. The resultant mixture was cooled and the toner obtained was washed 6 times in the manner stated in Example I, and dried on a freeze dryer. The resulting toner was comprised of 81 percent resin, 7 percent pigment, and 12 percent wax. The resulting toner had an aluminum content of 45 ppm by weight of toner indicating about 95 percent of the aluminum was extracted from the toner. The shape factor of the toner was 122 where a SF of 100 is considered very smooth and spherical in shape, a SF of 145 is considered irregular in shape with a rough morphology, and a SF of 125 a potato shape with a smooth surface. The fusing of the toner on the free nip belt fuser (FNBF) indicated that the toner had a gloss of about 70 ggu at 160° C. which was about 33 ggu higher than a toner which retained about 80 to about 95 percent of the aluminum used in the preparation of the toner.

Example V

Yellow Toner (6 Percent):

70.5 Grams of yellow pigment PY 74 comprised of 17 percent solids having a particle size of about 0.15 to about 0.2 micron dispersed in water and an anionic surfactant were added to 600 grams of water. To the resulting pigment dispersion were added 80 grams of a dispersion of the above submicron polyethylene P725 wax particles (30 percent solids) followed by the addition of 271 grams of the above prepared anionic latex A comprising submicron latex particles (40 percent solids) of styrene/butylacrylate/beta CEA, and then the resulting mixture polytroned at speeds of 5,000 rpm to which was added an aqueous PAC coagulant solution comprising 3.6 (equivalent of 0.18 pph by weight of toner) grams of 10 percent solids placed in 28 grams of 0.3 M nitric acid and polytroned for a period of 5 minutes.

The resulting blend was then heated to a temperature of 50° C. while stirring for a period of 150 minutes to obtain a particle size of 5.2 with a GSD of 1.22. 138 Grams of the above latex A were then added to the aggregate mixture and stirred at 50° C. for an additional 45 minutes to provide a particle size of 5.8 microns and the GSD was 1.21. The aggregate mixture was then stabilized from further growth (or throughout where further growth was minimal) by changing the pH of the mixture from about 2.6 to about 7 followed by the addition of 2 grams of EDTA, which is the equivalent of 1 pph of EDTA by weight of toner.

The resulting mixture was then heated to 95° C. After 100 minutes at 95° C., the particle size measured was 5.6 microns and the GSD was 1.20. The pH was maintained at 6 for a period of 300 minutes resulting in a particle size of 6 microns and a GSD of 1.21. The resultant mixture was cooled and the toner obtained was washed 6 times in the manner stated in Example I, and dried on a freeze dryer. The resulting toner was comprised of 81 percent resin, 6 percent pigment, and 12 percent wax. The resulting toner had an aluminum content of 122 ppm by weight of toner indicating about 90 percent of the aluminum was extracted from the toner. The shape factor of the toner was 122 where a SF of 100 is considered very smooth and spherical in shape while a SF of 145 is considered irregular in shape with a rough morphology, while a SF of 125 of a potato shape with a smooth surface. The fusing of the toner on the free nip belt fuser (FNBF) evidenced that the toner had a gloss of about 70 ggu at 160° C. which was about 30 ggu higher than a toner which contained about 80 to about 95 percent of the aluminum used in the preparation of the toner.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A toner process comprised of a first heating of a mixture of an aqueous colorant dispersion, an aqueous latex emulsion, and an aqueous wax dispersion in the presence of a coagulant to provide aggregates, adding a base followed by adding an organic sequestering agent, and thereafter accomplishing a second heating, and wherein said first heating is below about the latex polymer glass transition temperature (Tg), and said second heating is above about the latex polymer glass transition temperature wherein said organic sequestering agent complexes or chelates with said coagulant that contains a metal ion resulting in a precipitate which is insoluble in the aqueous phase thereby proving for extraction of said coagulant metal ion.

2. A process in accordance with claim 1 wherein said organic sequestering agent amount is from about 0.2 to about 2 pph by weight of toner.

3. A process in accordance with claim 1 wherein i) said colorant dispersion contains a pigment optionally of about 0.1 to about 0.3 micron in diameter dispersed in water and an anionic surfactant, and further wherein said wax dispersion is comprised of submicron wax particles of optionally from about 0.1 to about 0.5 micron in diameter by volume, and which wax is dispersed in water and an anionic surfactant;

(ii) the resulting mixture of (i) with said latex emulsion being optionally comprised of submicron polymer particles of about 0.15 to about 0.4 micron in diameter and containing water and an anionic surfactant;

(iii) wherein the resulting blend possesses a pH of about 2.2 to about 2.8, and to which blend is added said coagulant of a polymetal halide to enable flocculation or aggregation of the resin, colorant and wax particles;

(iv) heating the resulting mixture of (iii) below the glass transition temperature (Tg) of the latex polymer to form toner sized aggregates;

(v) adding to the formed toner aggregates a second portion of a latex comprised of resin suspended in an aqueous phase containing an ionic surfactant and water;

(vi) retaining the mixture temperature at from about 80° C. to about 95° C. and allowing the pH to decrease to a value of from about 5 to about 7;

(vii) optionally reducing the pH of (vi) by the addition of an acid, and heating to optionally increase the coalescence time and to assist the fusion or coalescence of the toner aggregates and to obtain smooth particles;

(viii) washing the resulting toner slurry; and (ix) isolating and drying the toner product.

4. A process in accordance with claim 1 wherein said organic sequestering agent is selected in an amount of about 0.2 to about 2 pph by weight of toner, and said agent is selected from the group consisting of ethylene diamine tetra acetic acid (EDTA), gluconal, sodium gluconate, potassium citrate, sodium citrate, a nitrotriacetate (NTA) salt; GLDA, the product of glutamic acid and N,N-diacetic acid; humic acid, fulvic acid, maltol and ethyl-maltol, peta-acetic and tetra-acetic acids.

5. A process in accordance with claim 1 wherein the organic sequestering is a biodegradable compound and is a salt of methyglycineduacetic acid (MGDA), GLUDA, a salt of glutamate, or N,N-bis (carboxymethyl), ethylenediaminedisuccinic acid (EDDS).

6. A process in accordance with claim 1 wherein the sequestering agent is ethylene diamine tetra acetic acid.

7. A process in accordance with claim 1 wherein the toner gloss is controlled by the amount of a coagulant metal ion extracted by the sequestering agent.

8. A process in accordance with claim 1 wherein the amount of sequestering agent utilized provides a mechanism for controlling the gloss of the toner, and wherein said gloss is increased by about 20 to about 35 ggu when said toner contains about 100 pph of a coagulant metal ion.

9. A process in accordance with claim 1 wherein said coagulant is selected from the group consisting of polyaluminumchloride (PAC), polyaluminum sulfosilicate (PASS), aluminum sulfate, zinc sulfate, and magnesium sulfate, and wherein said sequestering agent is selected in an amount of about 0.08 to about 0.2 pph by weight of toner.

10. A process in accordance with claim 1 wherein said sequestering agent extracts from about 50 to about 100 percent of the crosslinking coagulant metal ion from said toner, and which agent is selected in an amount of about 0.5 about 1.5 pph by weight of toner.

11. A process in accordance with claim 1 wherein said sequestering agent extracts about 60 to about 100 percent of the crosslinking ion from said toner when used in amounts of about 0.5 to about 1.5 pph by weight of toner, and resulting in a toner that enables high gloss.

12. A process in accordance with claim 1 wherein said colorant dispersion is comprised of a pigment of about 0.1 to about 0.3 micron in diameter dispersed in water and an anionic surfactant, and wherein said pigment is present in an amount of from about 4 to about 15 weight percent.

13. A process in accordance with claim 3 wherein said acid is nitric, sulfuric, hydrochloric, citric or acetic acid, and said coagulant is a polyaluminumchloride.

14. A process in accordance with claim 3 (v) wherein there is added to the formed toner aggregates a second portion of latex comprised of submicron resin particles suspended in an aqueous phase containing an anionic surfactant, and wherein said second latex is selected in an amount of from about 10 to about 40 percent by weight of the initial latex (i) to form a shell thereover on said formed aggregates, and which shell is of an optional thickness of about 0.2 to about 0.8 micron, and wherein said coagulant is optionally a polymetal halide.

15. A process in accordance with claim 3 (v) wherein said added latex contains the same resin as the initial latex of (i), or wherein said added latex contains a dissimilar resin than that of the initial latex.

16. A process in accordance with claim 3 wherein the aggregation (iv) temperature is from about 45° C. to about 60° C., and wherein the coalescence or fusion temperature of (vii) is from about 80° C. to about 95° C., and wherein said coagulant is a polyaluminum halide.

17. A process in accordance with claim 3 wherein the time of coalescence or fusion is from about 2 to about 6 hours, and wherein the toner resulting possesses a smooth morphology.

18. A process in accordance with claim 1 wherein said latex emulsion contains a resin, or a polymer selected from the group comprised of poly(styrene-alkyl acrylate), poly (styrene-1,3-diene), poly(styrene-alkyl methacrylate), poly (alkyl methacrylate-alkyl acrylate), poly(alkyl methacrylate-aryl acrylate), poly(aryl methacrylate-alkyl acrylate), poly (alkyl methacrylate), poly(styrene-alkyl acrylate-acrylonitrile), poly(styrene-1,3-diene-acrylonitrile), poly (alkyl acrylate-acrylonitrile), poly(styrene-butadiene), poly (methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly (ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly (styrene-propyl acrylate), poly(styrene-butyl acrylate), poly (styrene-butadiene-acrylonitrile), and poly(styrene-butyl acrylate-acrylononitrile).

19. A process in accordance with claim 1 wherein said latex emulsion contains a resin of a carboxylic acid selected from the group comprised of acrylic acid, methacrylic acid, itaconic acid, beta carboxy ethyl acrylate, fumaric acid, maleic acid, and cinnamic acid, and wherein said carboxylic acid is selected in an amount of from about 0.1 to about 10 weight percent.

20. A process in accordance with claim 1 wherein said wax dispersion contains a polyethylene wax, a polypropylene wax, or mixtures thereof, water, and an anionic surfactant, and wherein said wax is selected in an amount of from about 5 to about 20 weight percent.

21. A process comprised of heating a mixture of a colorant dispersion, and a latex emulsion in the presence of a coagulant, a base, and an organic sequestering agent, and wherein said heating involves a first heating and a second heating, and wherein the second heating is at a higher temperature than the first heating; and wherein said higher temperature is equal to about or above about the Tg of polymer or resin contained in said latex emulsion wherein said organic sequestering agent complexes or chelates with said coagulant that contains a metal ion resulting in a precipitate which is insoluble in the aqueous phase thereby proving for extraction of said coagulant metal ion.

22. A process comprised of heating a mixture of a colorant dispersion, a latex emulsion, and an optional wax dispersion in the presence of a coagulant containing a metal ion, a base, and an organic sequestering agent, and wherein said heating involves a first heating and a second heating, and wherein said first heating is below about or equal to about the Tg of polymer or resin contained in said latex, and said second heating is at a higher temperature than the first heating; and wherein said higher temperature is equal to about or above about the Tg of polymer or resin contained in said latex emulsion wherein said organic sequestering agent complexes or chelates with said coagulant that contains a metal ion resulting in a precipitate which is insoluble in the aqueous phase thereby proving for extraction of said coagulant metal ion.

23. A process in accordance with claim 22 wherein said sequestering agent is added subsequent to the addition of said base.

24. A process in accordance with claim 22 wherein said sequestering agent is added prior to the addition of said base.

25. A process in accordance with claim 22 wherein said colorant is black, cyan, magenta, yellow, green, orange, or mixtures thereof, and wherein said colorant is optionally present in an amount of from about 3 to about 12 percent by weight of toner.

26. A process in accordance with claim 22 wherein there is further included in said mixture of colorant and latex a wax and a surfactant or surfactants, and wherein said surfactant is optionally present in an amount of from about 0.01 to about 10 percent by weight or from about 0.1 to about 0.5 percent by weight of toner components.

27. A process in accordance with claim 1 wherein said colorant dispersion contains a pigment.

28. A process in accordance with claim 27 wherein said pigment is carbon black.

29. A process in accordance with claim 27 wherein said pigment is a cyan, a magenta, a yellow colored pigment, or mixtures thereof.

30. A toner process comprised of a first heating of a mixture of an aqueous colorant dispersion, an aqueous latex emulsion, and an aqueous wax dispersion in the presence of a coagulant to provide aggregates, adding an organic sequestering agent, and thereafter accomplishing a second heating, and wherein said first heating is below about the latex polymer glass transition temperature (Tg), and said second heating is above about the latex polymer glass transition temperature wherein said organic sequestering agent complexes or chelates with said coagulant that contains a metal ion resulting in a precipitate which is insoluble in the aqueous phase thereby proving for extraction of said coagulant metal ion.

31. A process in accordance with claim 30 wherein a base is added prior to the addition of said organic sequestering agent.

32. A process in accordance with claim 30 wherein said sequestering agent is ethylene diamine tetraacidic acid.

33. A process in accordance with claim 1 wherein said colorant dispersion contains a pigment, a dye, or mixtures thereof.

34. A process in accordance with claim 1 wherein said colorant dispersion contains a cyan, a magenta, a yellow pigment, or mixtures thereof.

35. A process in accordance with claim 1 wherein said colorant dispersion contains a pigment of carbon black.

* * * * *